US012668006B2

(12) United States Patent
Sato et al.

(10) Patent No.: US 12,668,006 B2
(45) Date of Patent: Jun. 30, 2026

(54) INTERMEDIATE MOLD, MOLD UNIT, AND INJECTION MOLDING MACHINE

(71) Applicant: SUMITOMO HEAVY INDUSTRIES, LTD., Tokyo (JP)

(72) Inventors: Takayuki Sato, Chiba (JP); Rei Takahashi, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 71 days.

(21) Appl. No.: 18/793,441

(22) Filed: Aug. 2, 2024

(65) Prior Publication Data

US 2025/0073965 A1    Mar. 6, 2025

(30) Foreign Application Priority Data

Aug. 31, 2023    (JP) ................................. 2023-141109

(51) Int. Cl.
B29C 45/04    (2006.01)
B29C 45/17    (2006.01)
(52) U.S. Cl.
CPC ...... B29C 45/0441 (2013.01); B29C 45/1742 (2013.01); B29K 2905/00 (2013.01)
(58) Field of Classification Search
None
See application file for complete search history.

(56) References Cited

U.S. PATENT DOCUMENTS

| | | | | |
|---|---|---|---|---|
| 3,390,427 A | * | 7/1968 | Ruekberg | .............. B29C 49/063 |
| | | | | 264/526 |
| 4,427,359 A | * | 1/1984 | Fukuoka | ........... B29C 49/42119 |
| | | | | 425/525 |
| 4,786,455 A | * | 11/1988 | Krishnakumar | .... B29C 45/7207 |
| | | | | 264/297.6 |
| 7,018,189 B2 | | 3/2006 | Wobbe et al. | |
| 2004/0180108 A1 | * | 9/2004 | Wobbe | .................. B29C 45/045 |
| | | | | 425/589 |

FOREIGN PATENT DOCUMENTS

| | | |
|---|---|---|
| CN | 112 677 450 A | 4/2021 |
| EP | 0 058 947 A1 | 9/1982 |
| EP | 0 070 189 A1 | 1/1983 |
| GB | 1 329 554 A | 9/1973 |

(Continued)

OTHER PUBLICATIONS

European search report of EP Application No. 24187365.2 Mailed on Jan. 8, 2025.

*Primary Examiner* — Mohammad M Ameen
(74) *Attorney, Agent, or Firm* — WTA IP Law P.C.

(57)    ABSTRACT

An intermediate mold is disposed between a stationary side mold and a movable side mold in a mold unit of an injection molding machine, the intermediate mold includes: a mold section that performs mold opening and closing operations with a facing mold of the stationary side mold and the movable side mold; a rotating frame body that is rotated together with the mold section by a rotary shaft; a support section that supports both sides of the rotating frame body via shaft bodies; and a rotation drive section that transmits a rotational force to the rotating frame body, in which the support section accommodates at least a part of the rotation drive section.

18 Claims, 9 Drawing Sheets

(56)     References Cited

FOREIGN PATENT DOCUMENTS

| | | | |
|----|----|----|----|
| JP | 2006 035667 | A | 2/2006 |
| JP | 4283181 | B2 | 6/2009 |
| JP | 5 394728 | B2 | 1/2014 |
| JP | 2022 115773 | A | 8/2022 |
| KR | 101 448 403 | B1 | 10/2014 |

* cited by examiner

TOP SIDE

VERTICAL
DIRECTION

BOTTOM SIDE d1

FIRST SIDE ← ROTATION AXIS DIRECTION → SECOND SIDE

FIRST SIDE ⟷ SECOND SIDE
ROTATION AXIS
DIRECTION

INTERMEDIATE MOLD, MOLD UNIT, AND INJECTION MOLDING MACHINE

CROSS-REFERENCE TO RELATED APPLICATIONS

This application claims priority to Japanese Patent Application No. 2023-141109, filed on Aug. 31, 2023, which is incorporated by reference herein in its entirety.

BACKGROUND

Technical Field

Certain embodiments of the present invention relate to an intermediate mold, a mold unit, and an injection molding machine.

Description of Related Art

As a mold unit included in an injection molding machine, there is a mold unit in which an intermediate mold is disposed between a mold on a stationary side and a mold on a movable side. In addition, as the intermediate mold, there is an intermediate mold including a rotating mold that moves while rotating between a position facing the mold on the stationary side and a position facing the mold on the movable side and alternately performs mold opening and closing operations at each position (for example, the related art). Such a rotating mold is attached to a rotating frame body including a rotary shaft, and rotates together with the rotating frame body when the rotating frame body rotates. The rotating frame body is rotated by a rotational force obtained from a rotation drive section configured to include a motor or the like.

SUMMARY

According to an embodiment of the present invention, there is provided an intermediate mold that is disposed between a stationary side mold and a movable side mold in a mold unit of an injection molding machine, the intermediate mold including: a mold section that performs mold opening and closing operations with a facing mold of the stationary side mold and the movable side mold; a rotating frame body that is rotated together with the mold section by a rotary shaft; a support section that supports both sides of the rotating frame body via shaft bodies; and a rotation drive section that transmits a rotational force to the rotating frame body, in which the support section accommodates at least a part of the rotation drive section.

Here, a recessed portion that accommodates at least a part of the rotation drive section may be formed in the support section.

In addition, the recessed portion may be formed at a position deviated from an extension line of the rotary shaft in a radial direction of the rotary shaft.

In addition, the recessed portion may be formed at a position deviated from the extension line of the rotary shaft toward a top side in a vertical direction.

In addition, at least a part of a rotational force transmitting mechanism that transmits the rotational force to the rotating frame body in the rotation drive section may be accommodated in the recessed portion.

In addition, the rotational force transmitting mechanism may be a gear mechanism that interlocks a plurality of gears.

In addition, a part of the rotation drive section may be disposed on an extension line of the rotary shaft.

In addition, the shaft bodies may include a hollow portion that allows a pipe through which a fluid passes to be disposed.

In addition, both end portions of the hollow portion may form inlet/outlet ports through which the pipe can enter and exit in a rotation axis direction of the shaft bodies.

In addition, the shaft bodies may be respectively attached to both sides of the rotating frame body in the rotation axis direction via bearings, and the rotation drive section and the pipe may be disposed on a side of one of the shaft bodies.

In addition, the shaft bodies may be respectively attached to both sides of the rotating frame body in a vertical direction via bearings, and the support section may support a top side and a bottom side of the rotating frame body via the shaft bodies.

In addition, the rotation drive section may be connected to the top side of the rotating frame body, and a pipe through which a fluid passes may be disposed in the shaft body attached to the bottom side of the rotating frame body.

According to an embodiment of the present invention, there is provided a mold unit of an injection molding machine, the mold unit including: an intermediate mold disposed between a stationary side mold and a movable side mold, in which the intermediate mold includes a mold section that performs mold opening and closing operations with a facing mold of the stationary side mold and the movable side mold, a rotating frame body that is rotated together with the mold section by a rotary shaft, a support section that supports both sides of the rotating frame body via shaft bodies, and a rotation drive section that transmits a rotational force to the rotating frame body, and the support section accommodates at least a part of the rotation drive section.

According to an embodiment of the present invention, there is provided an injection molding machine including: a mold unit that includes a stationary side mold, a movable side mold, and an intermediate mold disposed between the stationary side mold and the movable side mold, the mold unit being mounted in the injection molding machine, in which the intermediate mold includes a mold section that performs mold opening and closing operations with a facing mold of the stationary side mold and the movable side mold, a rotating frame body that is rotated together with the mold section by a rotary shaft, a support section that supports both sides of the rotating frame body via shaft bodies, and a rotation drive section that transmits a rotational force to the rotating frame body, and the support section accommodates at least a part of the rotation drive section.

DETAILED DESCRIPTION

An accommodation space for accommodating the mold unit including the intermediate mold in the injection molding machine is limited in terms of size due to a relationship with a size of the injection molding machine. Therefore, there is a demand for a compact size for the mold unit including the intermediate mold. However, the intermediate mold of the related art adopts a method of connecting the rotation drive section to the rotating frame body in series. In this case, an entirety of the rotation drive section is disposed on an extension line of a rotary shaft of the rotating frame body, which inhibits compactness of a size of the mold unit.

It is desirable to achieve compactness of a mold unit including an intermediate mold.

Hereinafter, embodiments of the present invention will be described in detail with reference to the accompanying drawings.

One Embodiment

Configuration of Injection Molding Machine

Figures 1A, 1B:
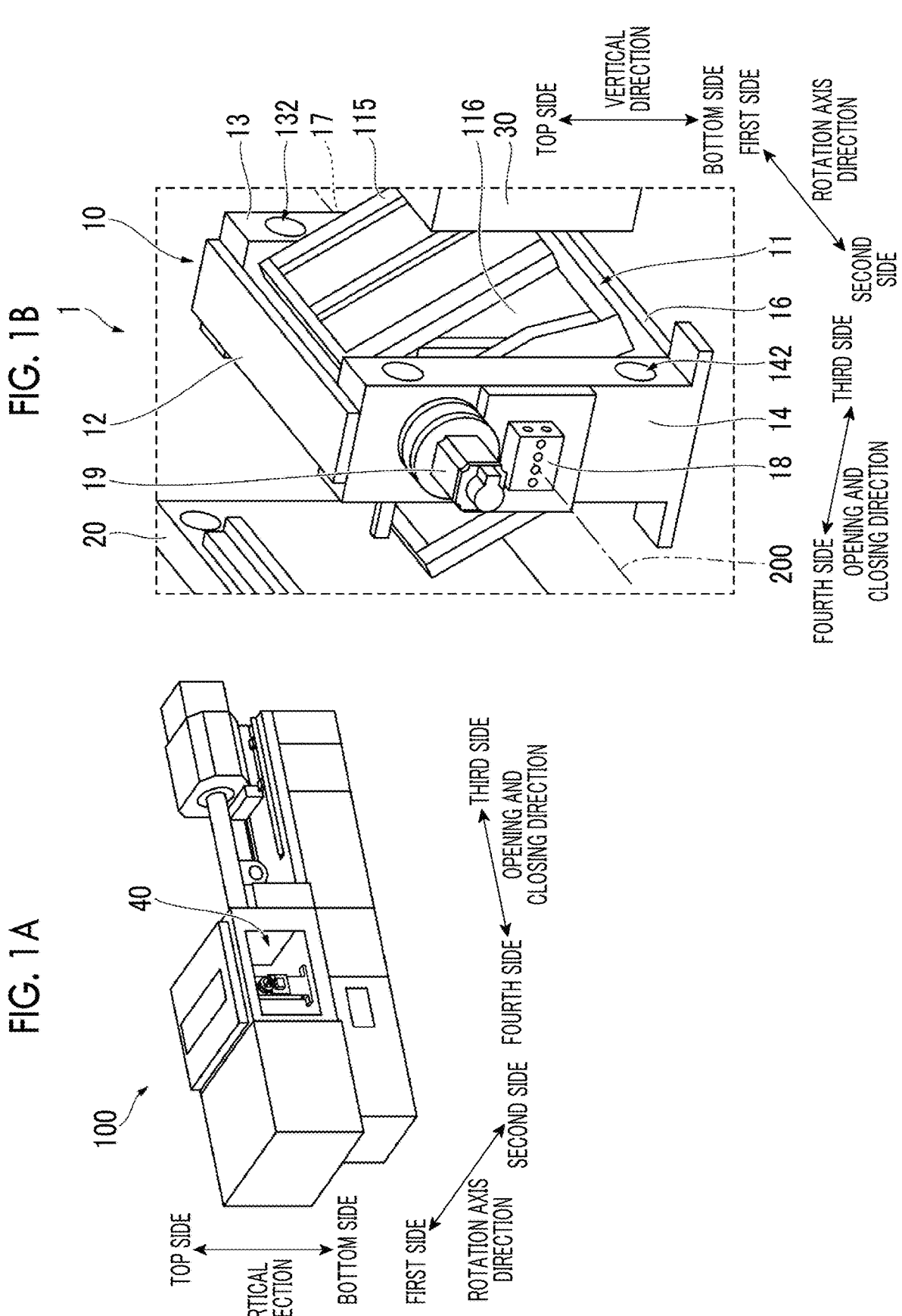
FIGS. 1A and 1B are perspective views showing an example of respective appearance configurations of a part of an injection molding machine and a part of a mold unit mounted in the injection molding machine according to one embodiment.

FIGS. 1A and 1B are perspective views showing an example of respective appearance configurations of a part of an injection molding machine 100 and a part of a mold unit 1 mounted in the injection molding machine 100 according to one embodiment.

Figure 2:
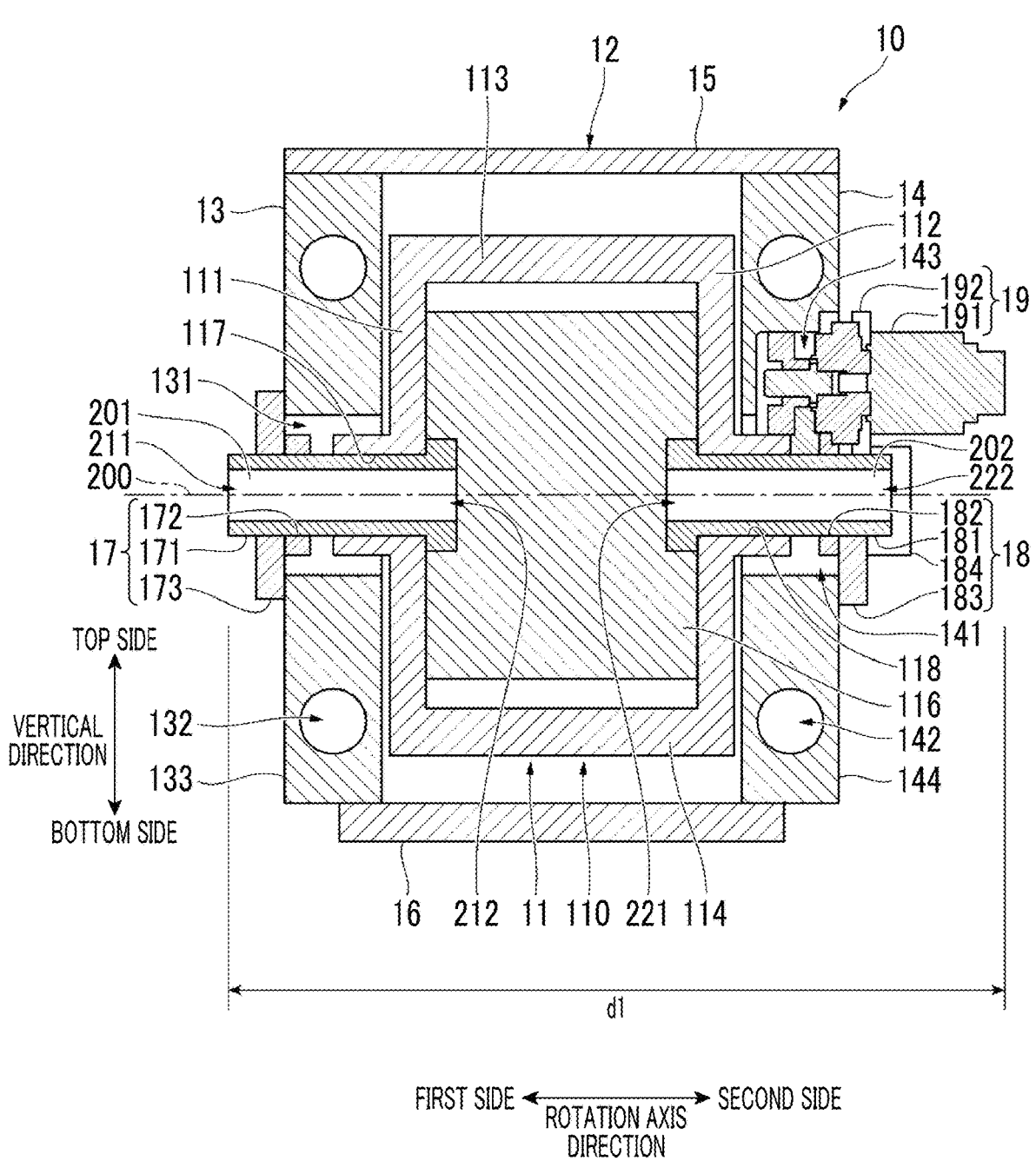
FIG. 2 is a cross-sectional view showing an example of a configuration of an intermediate mold of the mold unit.

FIG. 2 is a cross-sectional view showing an example of a configuration of an intermediate mold 10 of the mold unit 1.

Figure 3:
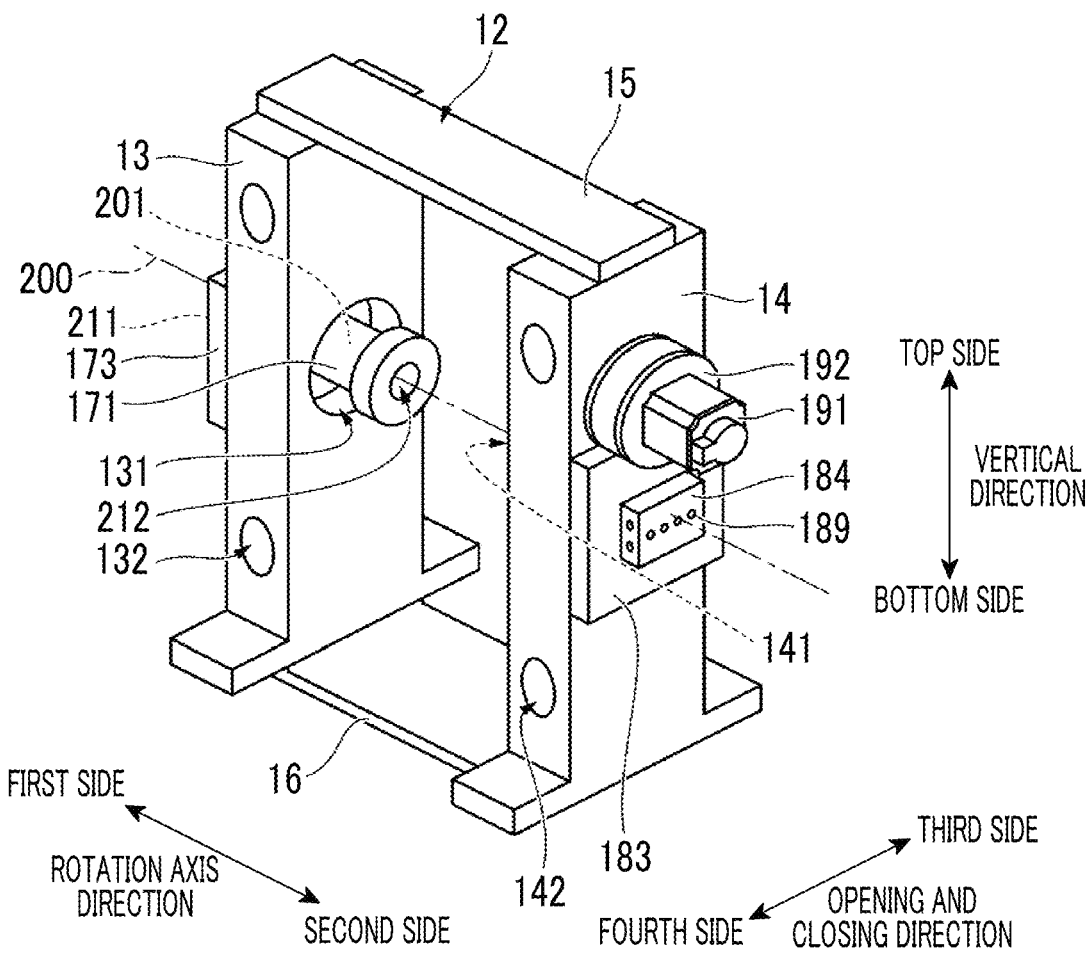
FIG. 3 is a perspective view showing a state after a mold section is removed from the intermediate mold.

FIG. 3 is a perspective view showing a state after a mold section 11 is removed from the intermediate mold 10.

Figure 4:
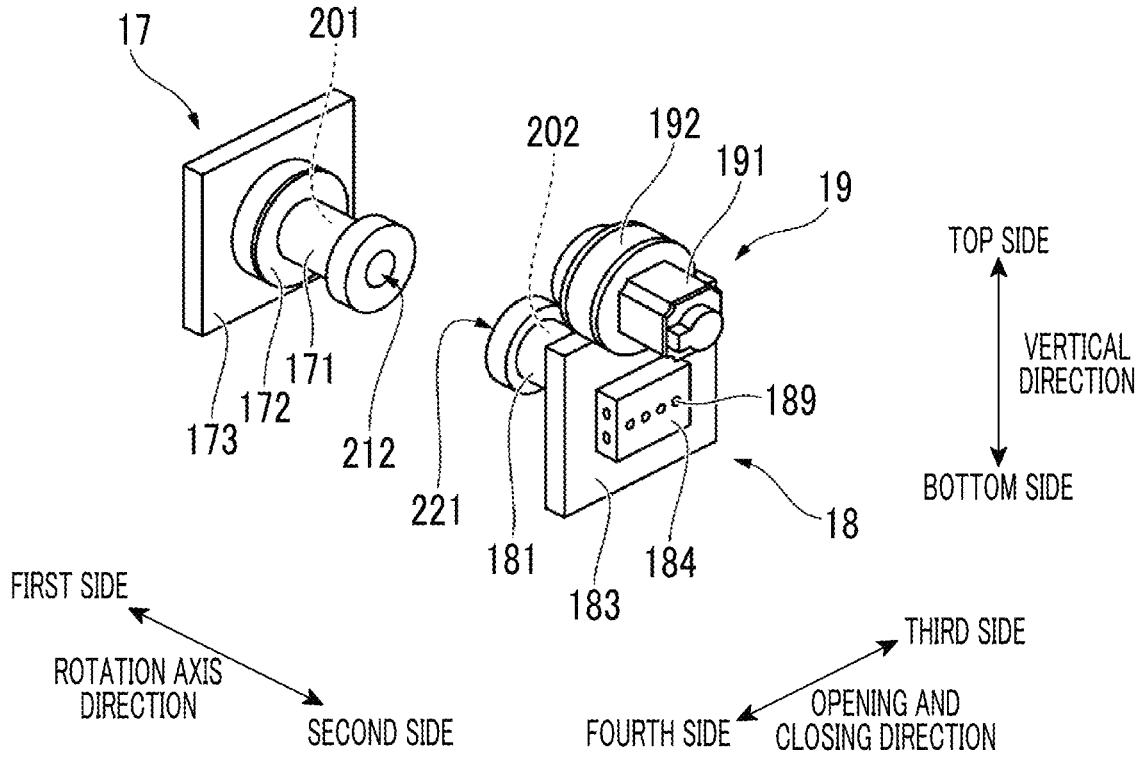
FIG. 4 is a perspective view showing an example of respective appearance configurations of a first shaft section, a second shaft section, and a rotation drive section.

FIG. 4 is a perspective view showing an example of respective appearance configurations of a first shaft section 17, a second shaft section 18, and a rotation drive section 19.

The injection molding machine 100 shown in FIGS. 1A and 1B is a molding machine used for injection blow molding. The injection blow molding refers to a molding method in which injection molding and blow molding are performed in two stages. In the injection blow molding, first, a preform, which serves as a prototype for a product, is molded in the injection molding. Then, in the blow molding, air is fed into an inside of the preform to expand the preform, thereby molding a product.

The injection molding machine 100 has an accommodation space 40, and the mold unit 1 is disposed in the accommodation space 40. The mold unit 1 is a mold unit that enables the injection blow molding, and is configured to include the intermediate mold 10, a stationary side mold 30, and a movable side mold 20. The intermediate mold 10 is a rotating mold disposed between the stationary side mold 30 and the movable side mold 20. The intermediate mold 10 performs a mold closing operation for closing the mold and a mold opening operation for opening the mold at a position facing each of the stationary side mold 30 and the movable side mold 20. The mold unit 1 performs injection molding by the mold closing operation between the intermediate mold 10 and the stationary side mold 30, and performs blow molding by the mold closing operation between the intermediate mold 10 and the movable side mold 20.

As shown in FIGS. 1B and 2, the intermediate mold 10 includes the mold section 11, a support section 12, the first shaft section 17, the second shaft section 18, and the rotation drive section 19. In addition, d1 in FIG. 2 indicates a length of the intermediate mold 10 according to one embodiment in a rotation axis direction, that is, a length from a first side end portion of a shaft body 171 of the first shaft section 17 to a second side end portion of a rotational force generating portion 191 of the rotation drive section 19.

The mold section 11 includes a rotating frame body 110 and plate units 115 and 116. The rotating frame body 110 included in the mold section 11 is a metal frame body that is rotated by a rotary shaft 200. The rotating frame body 110 is constituted by a first side portion 111, a second side portion 112, a top side portion 113, and a bottom side portion 114, which are metal plate materials, and these are connected by bolts or the like to form one frame body. The plate units 115 and 116 included in the mold section 11 are a plurality of mold plates attached to the rotating frame body 110. The plate unit 115 is configured to be removably attached to the rotating frame body 110 via a member (not shown), and to rotate together with the rotating frame body 110 when the rotating frame body 110 rotates. Contrary to this, the plate unit 116 is fixed to the shaft body 171 and a shaft body 181, which do not rotate, in a state of being disposed inside the rotating frame body 110. Therefore, unlike the plate unit 115, the plate unit 116 has a non-rotating configuration.

In the present embodiment, the rotating frame body 110 is described as an assembly of the first side portion 111, the second side portion 112, the top side portion 113, and the bottom side portion 114, which are metal plate materials (a boundary between the respective portions is not shown). However, the first side portion 111, the second side portion 112, the top side portion 113, and the bottom side portion 114 may be integrally formed, or may be formed by assembling a plurality of components.

The first shaft section 17 is attached to the first side portion 111 of the rotating frame body 110 via a bearing 117 formed of a bearing or the like. The second shaft section 18 is attached to the second side portion 112 of the rotating frame body 110 via a bearing 118 formed of a bearing or the like. In the mold section 11, when the rotating frame body 110 is rotated by the rotary shaft 200, the plate unit 115 is rotated together with the rotating frame body 110, and the plate unit 115 moves while rotating between the position where the injection molding is performed by the mold closing operation with the stationary side mold 30 (see FIGS. 1A and 1B) and the position where the blow molding is performed by the mold closing operation with the movable side mold 20 (see FIGS. 1A and 1B).

The support section 12 includes support members 13 to 16. As shown in FIGS. 2 and 3, the support member 13 included in the support section 12 is a member that supports the rotating frame body 110 via the first shaft section 17 attached to the first side portion 111 of the rotating frame body 110. The support member 13 is provided with a through-hole 131 formed in the rotation axis direction. The through-hole 131 forms a space for disposing the first shaft section 17. In addition, the support member 13 is provided with through-holes 132 formed in an opening and closing direction. The through-holes 132 are through-holes in which tie bars (not shown) that guide the mold opening and closing operations between the intermediate mold 10 and the stationary side mold 30 and the mold opening and closing operations between the intermediate mold 10 and the movable side mold 20 slide. The through-holes 132 are formed in the vicinity of respective end portions of the support member 13 on a top side and a bottom side in a vertical direction.

As shown in FIGS. 2 and 3, the support member 14 included in the support section 12 is a member that supports the rotating frame body 110 via the second shaft section 18 attached to the second side portion 112 of the rotating frame body 110. The support member 14 is provided with a through-hole 141 formed in the rotation axis direction. The through-hole 141 forms a space for disposing the second shaft section 18. In addition, the support member 14 is provided with through-holes 142 formed in the opening and closing direction. The through-holes 142 are through-holes in which tie bars (not shown) that guide the mold opening and closing operations between the intermediate mold 10 and the stationary side mold 30 and the mold opening and closing operations between the intermediate mold 10 and the movable side mold 20 slide. The through-holes 142 are formed in the vicinity of respective end portions of the support member 14 on the top side and the bottom side in the vertical direction.

In addition, as shown in FIG. 2, a recessed portion 143, which is a portion recessed in a direction toward a first side of the support member 14, is formed on a second side surface 144 of the support member 14 at a position deviated from an extension line of the rotary shaft 200 toward the top side. The recessed portion 143 is a recessed portion that forms a space capable of accommodating at least a part of the rotation drive section 19. In an example of FIG. 2, a part of a rotational force transmitting portion 192 included in the rotation drive section 19 is accommodated in the recessed portion 143. The recessed portion 143 may be formed at a position deviated from the extension line of the rotary shaft 200 toward the bottom side, but is preferably formed at a position deviated from the extension line of the rotary shaft 200 toward the top side as in the example of FIG. 2. This is due to the following reasons.

That is, in a case where the recessed portion 143 is formed at a position deviated from the extension line of the rotary shaft 200 toward the bottom side, the rotation drive section 19 is disposed on the bottom side with respect to the extension line of the rotary shaft 200. In this case, a pipe, which will be described below, is disposed on a side where the rotation drive section 19 is not disposed, that is, the top side with respect to the extension line of the rotary shaft 200, or on the extension line of the rotary shaft 200. However, compared to a case where the pipe is disposed on the bottom side with respect to the extension line of the rotary shaft 200, when a fluid leaks from the pipe, a probability of the fluid leaking toward the top side due to a relationship with a path and sagging of the pipe increases.

The support member 15 included in the support section 12 is a member disposed on the top side of the support members 13 and 14 as shown in FIGS. 2 and 3. The support member 15 may be detachably connected to the support members 13 and 14 by bolts or the like, or may be joined by welding or the like. As shown in FIGS. 1A to 3, the support member 16 included in the support section 12 is a member disposed on the bottom side of the support members 13 and 14, and positions the support member 13 and the support member 14. The support member 16 may be detachably fixed to the support member 13 and the support member 14 by bolts or the like, or may be joined by welding or the like. In addition, the support members 13 to 16 may be integrally formed.

As shown in FIGS. 2 to 4, the first shaft section 17 includes a shaft body 171, a first fixing member 172, and a second fixing member 173. The shaft body 171 is a member that allows the rotating frame body 110 to be rotated by the rotary shaft 200 in a state of being attached to the first side portion 111 via the bearing 117 of the rotating frame body 110. In the shaft body 171, a hollow portion 201 that allows the pipe through which the fluid (liquid or gas) such as a refrigerant passes to be disposed is formed. An inlet/outlet port 211 and an inlet/outlet port 212 for leading the pipe disposed in the hollow portion 201 to an outside are respectively formed in the first side end portion and a second side end portion of the shaft body 171.

The first fixing member 172 is a member that fixes the shaft body 171 in a state of penetrating the second fixing member 173, and is joined to the shaft body 171 and the second fixing member 173 by welding or the like. The second fixing member 173 is fixed to a first side surface 133 of the support member 13 by a bolt or the like.

As shown in FIGS. 2 to 4, the second shaft section 18 includes the shaft body 181, a first fixing member 182, a second fixing member 183, and a manifold 184. The shaft body 181 is a member that allows the rotating frame body 110 to be rotated by the rotary shaft 200 in a state of being attached to the second side portion 112 via the bearing 118 of the rotating frame body 110. In the shaft body 181, a hollow portion 202 that allows the pipe through which the fluid (liquid or gas) such as a refrigerant passes to be disposed is formed. An inlet/outlet port 221 and an inlet/outlet port 222 for leading the pipe disposed in the hollow portion 202 to the outside are respectively formed in a first side end portion and a second side end portion of the shaft body 181. The first fixing member 182 is a member that fixes the shaft body 181 in a state of penetrating the second fixing member 183, and is joined to the shaft body 181 and the second fixing member 183 by welding or the like. The second fixing member 183 is fixed to the second side surface 144 of the support member 14 by a bolt or the like.

As shown in FIGS. 2 to 4, the manifold 184 is a box-shaped metal member for collecting or branching out pipes disposed in the hollow portion 202 of the shaft body 181 to lead the pipes to an outside of the intermediate mold 10. The manifold 184 is disposed to cover the inlet/outlet port 222 of the second side end portion of the shaft body 181 penetrating the second fixing member 183. As shown in FIGS. 3 and 4, the manifold 184 is provided with a plurality of through-holes 189 that allow the pipes that are led from the inlet/outlet port 222 of the second side end portion of the shaft body 181 to be disposed.

As shown in FIGS. 2 to 4, the rotation drive section 19 includes the rotational force generating portion 191 that generates a rotational force and a rotational force transmitting portion 192 that transmits the rotational force generated by the rotational force generating portion 191 to the rotating frame body 110, and rotates the rotating frame body 110. The rotational force generating portion 191 is configured to include a motor or the like. The rotational force transmitting portion 192 is configured to include, for example, a gear box including a plurality of gears, shafts, bearings, and the like.

In the rotation drive section 19, the rotational force of the rotational force generating portion 191 is transmitted to the second side portion 112 of the rotating frame body 110 by the rotational force transmitting portion 192 serving as a rotational force transmitting mechanism to rotate the rotating frame body 110. In the rotation drive section 19 according to one embodiment, a part of the rotational force transmitting portion 192 is accommodated in the recessed portion 143 of the support member 14, and the other part is disposed to be exposed from the recessed portion 143 to the second side.

Figure 5:
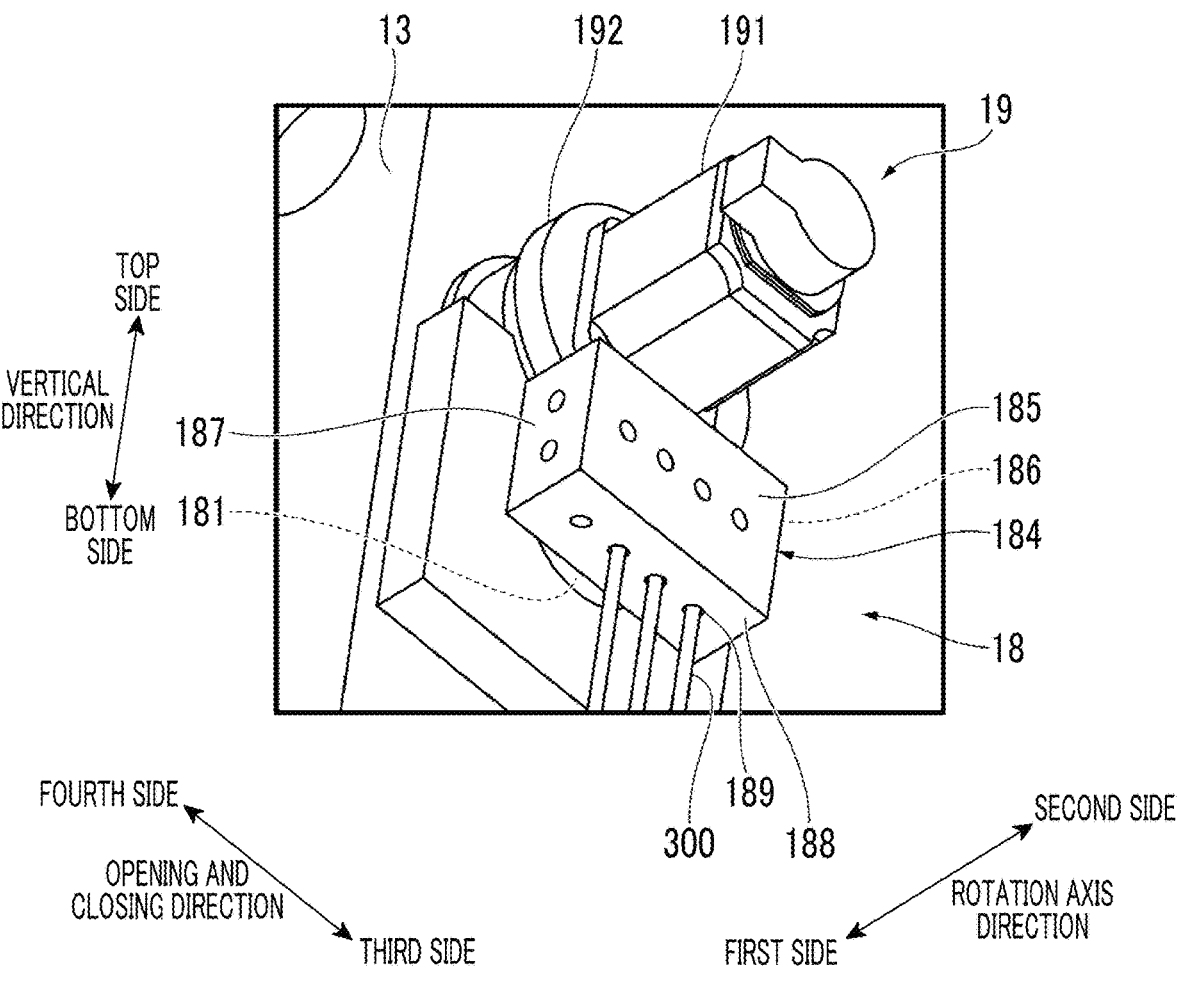
FIG. 5 is a perspective view showing a form when the second shaft section and the rotation drive section are viewed from a bottom side toward a top side in a vertical direction.

FIG. 5 is a perspective view showing a form when the second shaft section 18 and the rotation drive section 19 are viewed from the bottom side toward the top side in the vertical direction.

As shown in FIG. 2 described above, the hollow portion 202 that allows the pipe or the electrical wire to be disposed is formed in the shaft body 181 of the second shaft section 18. The pipe or the electrical wire passing through the hollow portion 202 is disposed to be led to the outside of the intermediate mold 10 via the inlet/outlet port 222 of the second side end portion of the shaft body 181 and the manifold 184. FIG. 5 shows, as an example, a form in which the pipe 300 is led to the outside of the intermediate mold 10 via the manifold 184.

In the example of FIG. 5, the plurality of through-holes 189 are provided in each of a second side surface 185 in the rotation axis direction, a third side surface 186 in the opening and closing direction, a fourth side surface 187 in the opening and closing direction, and a bottom side surface 188 in the vertical direction in the manifold 184. Specifically, four through-holes 189 are provided in the bottom side surface 188 of the manifold 184 in the vertical direction, and a pipe 300 is disposed in each of three through-holes 189. All of the pipes 300 extend toward the bottom side. In addition, a form of the disposition of the through-holes 189 of the manifold 184 and the pipes 300 shown in FIG. 5 is merely an example.

Figure 6:
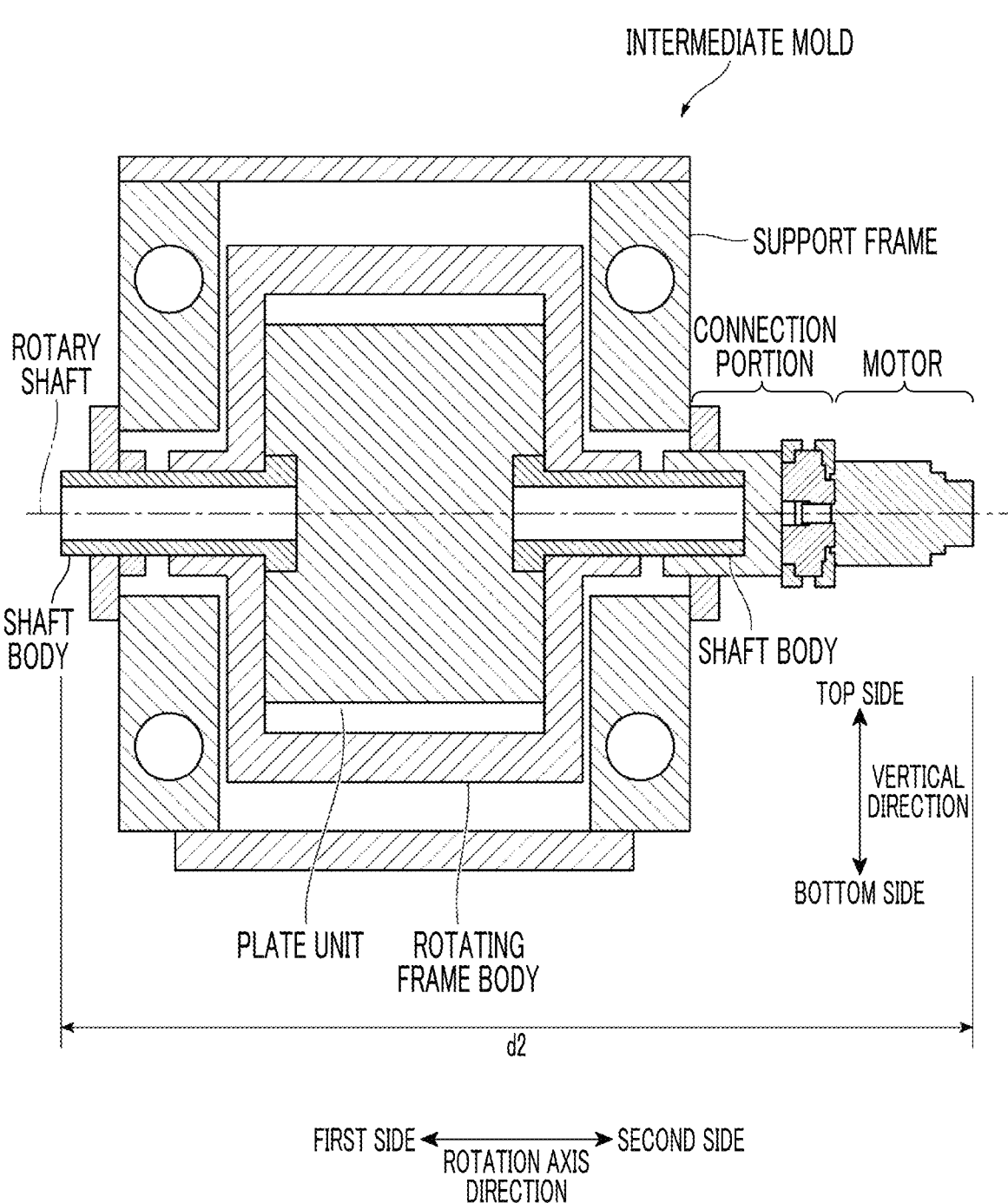
FIG. 6 is a cross-sectional view showing an example of a configuration of an intermediate mold of a mold unit mounted in an injection molding machine of the related art.

FIG. 6 is a cross-sectional view showing an example of a configuration of an intermediate mold of a mold unit mounted in an injection molding machine of the related art.

FIG. 6 shows, as the intermediate mold of the related art, a specific example of an intermediate mold including a rotating frame body to which a plate unit of a mold are attached, shaft bodies respectively attached to a first side and a second side of the rotating frame body in a rotation axis direction via bearings, a support frame that fixes the shaft bodies, and a motor that applies a rotational force to the shaft body via a connection portion. A rotary shaft shown in FIG. 6 is in the same direction as the rotary shaft 200 shown in FIG. 2 described above.

When a length d2 of an intermediate mold of the related art in a rotation axis direction shown in FIG. 6 is compared with a length d1 of the intermediate mold 10 according to one embodiment in the rotation axis direction shown in FIG. 2, d2>d1 is satisfied.

This is because the intermediate mold of the related art is configured such that a motor and a connection portion are disposed on an extension line of a rotary shaft, whereas the rotation drive section 19 according to one embodiment is configured such that a part of the rotation drive section 19 (a part of the rotational force transmitting portion 192 in the example of FIG. 2) is accommodated in the recessed portion 143 of the support member 14 provided at a position deviated from the extension line of the rotary shaft 200 in a radial direction of the rotary shaft 200.

In summary, the intermediate mold, the mold unit, and the injection molding machine to which one embodiment of the present invention is applied can take various embodiments with the following configuration.

That is, the intermediate mold 10 according to one embodiment is an intermediate mold disposed between the stationary side mold 30 and the movable side mold 20 in the mold unit 1 of the injection molding machine 100, and includes: the mold section 11 that performs the mold opening and closing operations with a facing mold of the stationary side mold 30 and the movable side mold 20; the rotating frame body 110 that is rotated together with the mold section 11 by the rotary shaft 200; the support section 12 that supports both sides of the rotating frame body 110 via the shaft bodies 171 and 181; and the rotation drive section 19 that transmits a rotational force to the rotating frame body 110, in which the support section 12 accommodates at least a part of the rotation drive section 19.

Accordingly, since a part of the rotation drive section 19 is accommodated in the support section 12, a compact size of the mold unit 1 including the intermediate mold 10 in the rotation axis direction can be achieved compared to a case where a part of the rotation drive section 19 is not accommodated in the support section 12. Furthermore, the pipe 300 can be led from a side where the rotation drive section 19 is disposed.

Here, the recessed portion 143 that accommodates at least a part of the rotation drive section 19 may be formed in the support member 14 of the support section 12.

Accordingly, since at least a part of the rotation drive section 19 is accommodated in the recessed portion 143 of the support member 14, a compact size of the mold unit 1 including the intermediate mold 10 in the rotation axis direction can be achieved compared to a case where at least a part of the rotation drive section 19 is not accommodated in the recessed portion 143 of the support section 12.

In addition, the recessed portion 143 may be formed at a position deviated from the extension line of the rotary shaft 200 in a radial direction of the rotary shaft 200.

Accordingly, since at least a part of the rotation drive section 19 is accommodated in the recessed portion 143 formed at a position deviated from the extension line of the rotary shaft 200 in the radial direction of the rotary shaft 200, at least a part of the rotation drive section 19 is disposed in parallel with the shaft body 181, instead of being disposed in series with the shaft body 181. As a result, a compact size of the mold unit 1 including the intermediate mold 10 in the rotation axis direction can be achieved compared to a case where at least a part of the rotation drive section 19 is disposed in series with the shaft body 181.

In addition, the recessed portion 143 may be formed at a position deviated from the extension line of the rotary shaft 200 toward the top side in the vertical direction.

Accordingly, since at least a part of the rotation drive section 19 is disposed on the top side with respect to the shaft body 181, the pipe 300 can be extended to the bottom side where the rotation drive section 19 is not disposed. As a result, when the fluid leaks from the pipe 300, it is possible to reduce a probability of the fluid leaking toward the top side due to the relationship between the path and sagging of the pipe 300 can be reduced.

In addition, at least a part of the rotational force transmitting portion 192 that transmits a rotational force to the rotating frame body 110 in the rotation drive section 19 may be accommodated in the recessed portion 143.

Accordingly, since at least a part of the rotational force transmitting portion 192 is accommodated in the recessed portion 143, at least a part of the rotational force transmitting portion 192 is disposed in parallel with the rotary shaft 200, instead of being disposed in series with the rotary shaft 200. As a result, a compact size of the mold unit 1 including the intermediate mold 10 in the rotation axis direction can be achieved compared to a case where at least a part of the rotational force transmitting portion 192 is disposed in series with the rotary shaft 200.

In addition, the rotational force transmitting mechanism may be a gear mechanism that interlocks a plurality of gears.

Accordingly, for example, a size of the rotational force transmitting mechanism can be reduced compared to a case where the rotational force transmitting mechanism is a belt mechanism instead of the gear mechanism. As a result, the space formed by the recessed portion 143 can be reduced (a recess of the support member 14 can be reduced). Therefore, strength of the support member 14 in which the recessed portion 143 is formed can be guaranteed.

In addition, the shaft bodies (for example, the shaft body 181) may include a hollow portion (for example, the hollow portion 202) that allows the pipe 300 through which a fluid passes to be disposed.

Accordingly, since the pipe 300 is disposed in the hollow portion of the non-rotating shaft body, a pipe group can be accommodated inside the intermediate mold 10. As a result, the intermediate mold 10 can be accommodated in the accommodation space 40 in a compact manner.

In addition, both end portions of the hollow portion (for example, the hollow portion 202) may form the inlet/outlet ports (for example, the inlet/outlet ports 221 and 222) through which the pipe 300 can enter and exit in the rotation axis direction of the shaft bodies (for example, the shaft body 181).

Accordingly, the pipe can be disposed in the non-rotating shaft body 181.

In addition, the shaft bodies 171 and 181 may be respectively attached to both sides of the rotating frame body 110 in the rotation axis direction via the bearings, and the rotation drive section 19 and the pipe 300 may be disposed in the shaft body (for example, the shaft body 181) attached to one of the shaft bodies 171 and 181.

Accordingly, even when the rotation drive section 19 is connected to the shaft body 181, the pipe 300 can be disposed in the shaft body 181 from the same side as the rotation drive section 19.

In addition, the present invention provides the mold unit 1 of the injection molding machine 100, in which the intermediate mold 10 disposed between the stationary side mold 30 and the movable side mold 20 includes the mold section 11 that performs the mold opening and closing operations with a facing mold of the stationary side mold 30 and the movable side mold 20, the rotating frame body 110 that is rotated together with the mold section 11 by the rotary shaft 200, the support section 12 that supports both sides of the rotating frame body 110 via the shaft bodies 171 and 181, and the rotation drive section 19 that transmits a rotational force to the rotating frame body 110, and the support section 12 accommodates at least a part of the rotation drive section 19.

Accordingly, since a part of the rotation drive section 19 is accommodated in the support section 12, a compact size of the mold unit 1 including the intermediate mold 10 in the rotation axis direction can be achieved compared to a case where a part of the rotation drive section 19 is not accommodated in the support section 12. Furthermore, the pipe can be led from a side where the rotation drive section 19 is disposed.

In addition, the present invention provides the injection molding machine 100 in which the mold unit 1 including the stationary side mold 30, the movable side mold 20, and the intermediate mold 10 disposed between the stationary side mold 30 and the movable side mold 20 is mounted, in which the intermediate mold 10 includes the mold section 11 that performs the mold opening and closing operations with a facing mold of the stationary side mold 30 and the movable side mold 20, the rotating frame body 110 that is rotated together with the mold section 11 by the rotary shaft 200, the support section 12 that supports both sides of the rotating frame body 110 via the shaft bodies 171 and 181, and the rotation drive section 19 that transmits a rotational force to the rotating frame body 110, and the support section 12 accommodates at least a part of the rotation drive section 19.

Accordingly, since a part of the rotation drive section 19 is accommodated in the support section 12, a compact size of the mold unit 1 including the intermediate mold 10 in the rotation axis direction can be achieved compared to a case where a part of the rotation drive section 19 is not accommodated in the support section 12. Furthermore, the pipe can be led from a side where the rotation drive section 19 is disposed.

Another Embodiment

Figure 7:
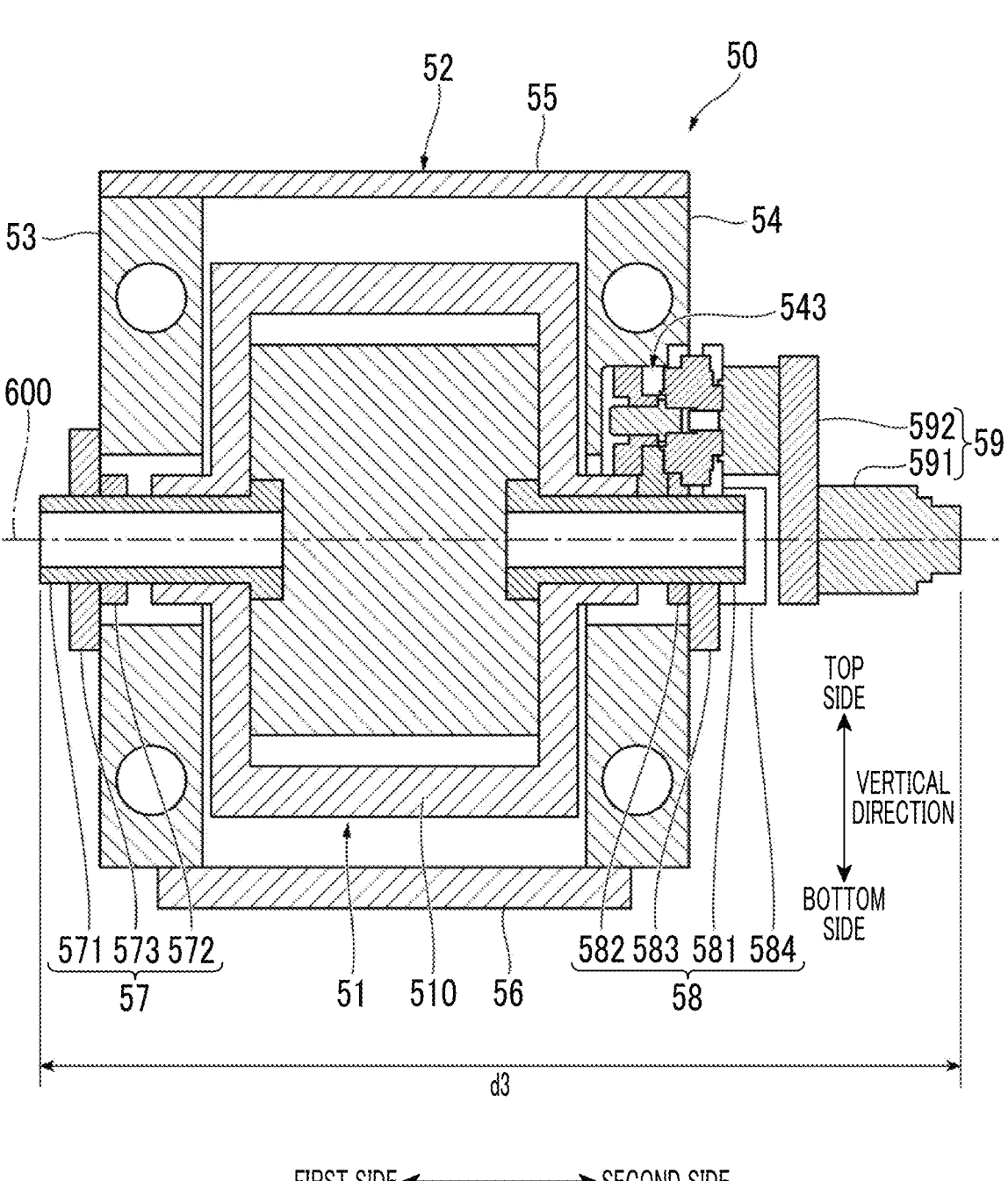
FIG. 7 is a cross-sectional view showing an example of a configuration of an intermediate mold of a mold unit according to another embodiment mounted in the injection molding machine of FIGS. 1A and 1B.

FIG. 7 is a cross-sectional view showing an example of a configuration of an intermediate mold 50 of a mold unit according to another embodiment mounted in the injection molding machine 100 of FIGS. 1A and 1B. In addition, in FIG. 7, a back side of the drawing refers to a third side in the opening and closing direction of FIGS. 1A and 1B, and a front side of the drawing refers to a fourth side in the opening and closing direction of FIGS. 1A and 1B.

As shown in FIG. 7, the intermediate mold 50 includes a mold section 51, a support section 52, a first shaft section 57, a second shaft section 58, and a rotation drive section 59. The mold section 51 includes a rotating frame body 510 which is a metal frame body that is rotated by a rotary shaft 600.

The support section 52 includes support members 53 to 56. The support member 54 in the support section 52 is a member that supports the mold section 51 via the second shaft section 58 attached to a second side of the mold section 51. A recessed portion 543 is formed at a position deviated from an extension line of the rotary shaft 600 toward the top side on a second side of the support member 54. The recessed portion 543 is a recessed portion that forms a space capable of accommodating at least a part of the rotation drive section 59.

The first shaft section 57 includes a shaft body 571, a first fixing member 572, and a second fixing member 573. The second shaft section 58 includes a shaft body 581, a first fixing member 582, a second fixing member 583, and a manifold 584.

As shown in FIG. 7, the rotation drive section 59 includes a rotational force generating portion 591 that generates a rotational force and a rotational force transmitting portion 592 that transmits the rotational force generated by the rotational force generating portion 591 to the rotating frame body 510, and rotates the rotating frame body 510. In the rotation drive section 59 according to another embodiment, a part of the rotational force transmitting portion 592 is accommodated in the recessed portion 543, and the remaining part of the rotational force transmitting portion 592 includes a portion disposed to protrude from the recessed portion 543 toward the second side and a portion disposed on the extension line of the rotary shaft 600 together with the rotational force generating portion 591.

In the rotation drive section 59, the rotational force of the rotational force generating portion 591 is transmitted to the rotating frame body 510 via the rotational force transmitting portion 592 serving as a rotational force transmitting mechanism to rotate the mold section 51 including the rotating frame body 510. In the example of FIG. 7, the rotational force of the rotational force generating portion 591 disposed on the extension line of the rotary shaft 600 is transmitted to the rotating frame body 510 via the portion disposed on the extension line of the rotary shaft 600, the portion disposed to protrude from the recessed portion 543 toward the second side, and the part accommodated in the recessed portion 543 in the rotational force transmitting portion 592 to rotate the mold section 51.

In addition, the other configurations of the mold section 51, the support section 52, the first shaft section 57, and the second shaft section 58 shown in FIG. 7 are the same as the configurations of the mold section 11, the support section 12, the first shaft section 17, and the second shaft section 18 shown in FIG. 2 described above, and the description thereof will be omitted. In addition, d3 in FIG. 7 indicates a length of the intermediate mold 50 according to another embodiment in the rotation axis direction.

Here, when a length d3 of the intermediate mold 50 according to another embodiment in the rotation axis direction shown in FIG. 7 is compared with the length d2 of the intermediate mold of the related art in the rotation axis direction shown in FIG. 6, d3<d2 is satisfied. This is because the intermediate mold of the related art is configured such that the motor and the connection portion are disposed on the extension line of the rotary shaft, whereas the rotation drive section 59 according to another embodiment is configured such that although the rotational force generating portion 591 is disposed on the extension line of the rotary shaft 600, a part of the rotational force transmitting portion 592 is accommodated in the recessed portion 543 of the support member 54 provided at a position deviated from the extension line of the rotary shaft 600 in a radial direction of the rotary shaft 600.

In summary, the intermediate mold, the mold unit, and the injection molding machine to which another embodiment of the present invention is applied can take various embodiments with the following configuration.

That is, the intermediate mold 50 according to another embodiment is an intermediate mold disposed between the stationary side mold 30 and the movable side mold 20 in the mold unit 1 of the injection molding machine 100, and includes: the mold section 51 that performs the mold opening and closing operations with a facing mold of the stationary side mold 30 and the movable side mold 20; the rotating frame body that is rotated together with the mold section 51 by the rotary shaft 600; the support section 52 that supports both sides of the rotating frame body via the shaft bodies 571 and 581; and the rotation drive section 59 that transmits a rotational force to the rotating frame body 510, in which the support section 52 accommodates at least a part of the rotation drive section 59.

Here, a part of the rotation drive section 59 may be disposed on the extension line of the rotary shaft 600.

Accordingly, a part of the rotation drive section 59 can be disposed on the extension line of the rotary shaft 600, and the remaining part can be disposed at a position deviated from the extension line of the rotary shaft 600. As a result, a compact size of the mold unit 1 including the intermediate mold 50 in the rotation axis direction can be achieved compared to a case where an entirety of the rotation drive section 59 is disposed on the extension line of the rotary shaft 600. Furthermore, the pipe can be led from a side where the rotation drive section 19 is disposed.

Still Another Embodiment

Figure 8:
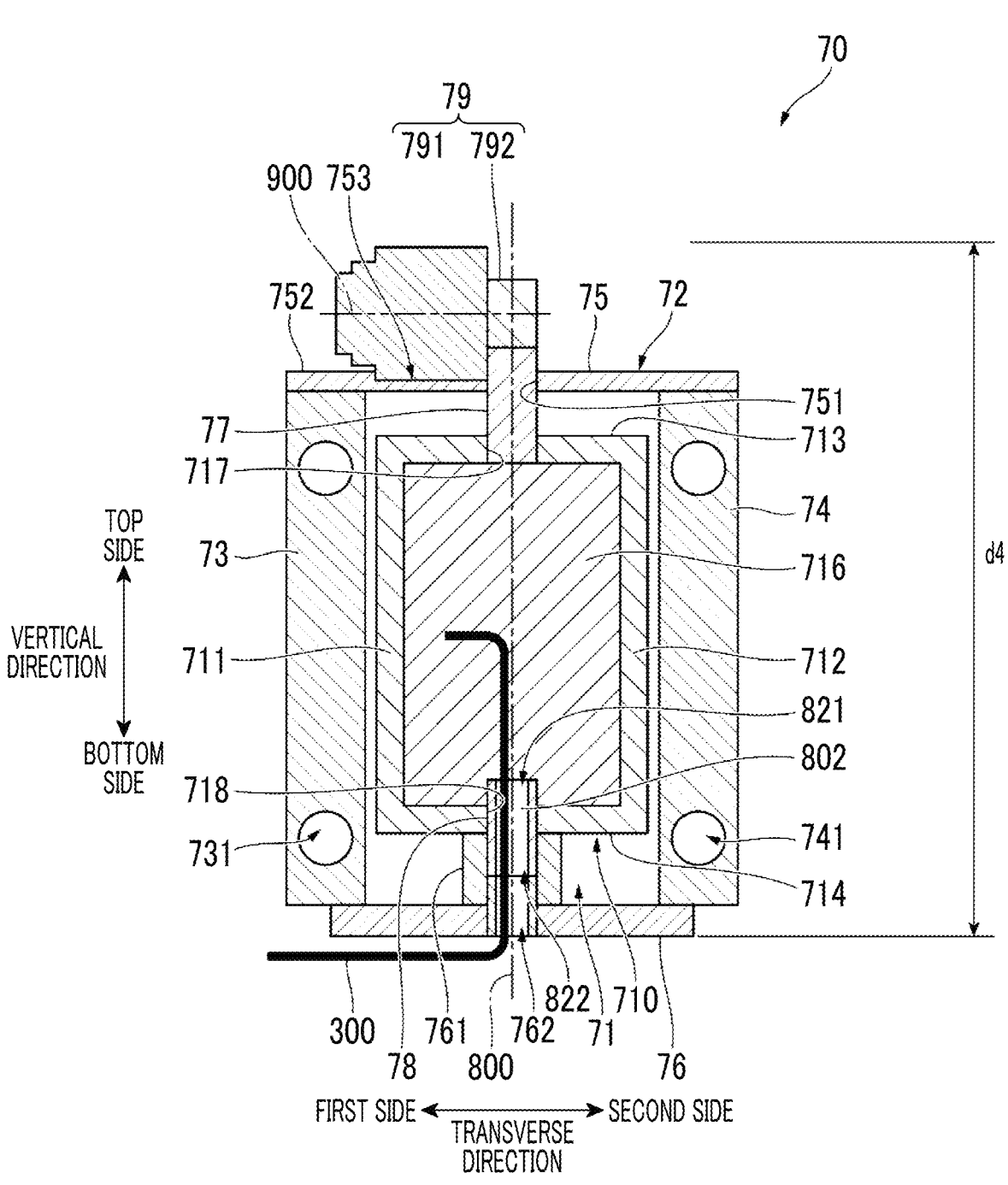
FIG. 8 is a cross-sectional view showing an example of a configuration of an intermediate mold of a mold unit according to still another embodiment mounted in the injection molding machine of FIGS. 1A and 1B.

FIG. 8 is a cross-sectional view showing an example of a configuration of an intermediate mold 70 of a mold unit according to still another embodiment mounted in the injection molding machine 100 of FIGS. 1A and 1B. In addition, a transverse direction of the intermediate mold 70 in FIG. 8 is the same direction as the opening and closing direction in FIGS. 1A and 1B, a back side of the drawing of FIG. 8 is the third side in the opening and closing direction in FIGS. 1A and 1B, and a front side of the drawing of FIG. 8 is the fourth side in the opening and closing direction in FIGS. 1A and 1B.

The intermediate mold 70 shown in FIG. 8 includes a mold section 71, a support section 72, shaft bodies 77 and 78, and a rotation drive section 79. The mold section 71 includes a rotating frame body 710 and a plate unit 716. The support section 72 includes support members 73 to 76. In addition, d4 in FIG. 8 indicates a length of the intermediate mold 70 according to still another embodiment in the vertical direction.

The rotating frame body 710 included in the mold section 71 is a metal frame body that is rotated by a rotary shaft 800. The rotating frame body 710 is constituted by a first side portion 711, a second side portion 712, a top side portion 713, and a bottom side portion 714, which are metal plate materials, and these are connected by bolts or the like to form one frame body. A plate unit 716 and a plate unit (not shown) are attached to the rotating frame body 710. The plate unit 716 has a non-rotating configuration. Contrary to this, the plate unit (not shown) is configured to rotate together with the rotating frame body 710 when the rotating frame body 710 rotates.

The shaft body 77 is attached to the top side portion 713 of the rotating frame body 710 via a bearing 717 formed of a bearing or the like. The shaft body 78 is attached to the bottom side portion 714 of the rotating frame body 710 via a bearing 718 formed of a bearing or the like. In the mold section 71, when the rotating frame body 710 is rotated by the rotary shaft 800, the plate unit (not shown) attached to the rotating frame body 710 is rotated together with the rotating frame body 710, and the plate unit (not shown) moves while rotating between the position where the injection molding is performed by the mold closing operation with the stationary side mold 30 (see FIGS. 1A and 1B) and the position where the blow molding is performed by the mold closing operation with the movable side mold 20 (see FIGS. 1A and 1B).

The support member 73 in the support section 72 is provided with through-holes 731 formed in the opening and closing direction. The through-holes 731 are through-holes in which tie bars (not shown) that guide the mold opening and closing operations between the intermediate mold 70 and the stationary side mold 30 and the mold opening and closing operations between the intermediate mold 70 and the movable side mold 20 slide. The through-holes 731 are formed in the vicinity of respective end portions of the support member 73 on the top side and the bottom side in the vertical direction.

The support member 74 in the support section 72 is provided with through-holes 741 formed in the opening and closing direction. The through-holes 741 are through-holes in which tie bars (not shown) that guide the mold opening and closing operations between the intermediate mold 70 and the stationary side mold 30 and the mold opening and closing operations between the intermediate mold 70 and the movable side mold 20 slide. The through-holes 741 are formed in the vicinity of respective end portions of the support member 74 on the top side and the bottom side in the vertical direction.

The support member 75 in the support section 72 is a member disposed on the top side of the support members 73 and 74. The support member 75 includes a fixing member 751, and fixes the shaft body 77 attached to the top side portion 713 of the rotating frame body 710 via the bearing 717. The support member 75 may be detachably connected to the support members 73 and 74 by bolts or the like, or may be joined by welding or the like. A recessed portion 753 is formed on a top side surface 752 of the support member 75. The recessed portion 753 forms a space that can accommodate a part of the rotation drive section 79.

The support member 76 in the support section 72 is a member disposed on the bottom side of the support members 73 and 74, and positions the support member 73 and the support member 74. The support member 76 includes a fixing member 761, and supports the rotating frame body 710 via the shaft body 78 attached to the bottom side portion 714 of the rotating frame body 710. The support member 76 may be detachably fixed to the support member 73 and the support member 74 by bolts or the like, or may be joined by welding or the like. The support member 76 is provided with a through-hole 762 for passing the pipe 300 therethrough.

The shaft body 77 is a member that allows the rotating frame body 710 to be rotated by the rotary shaft 800 in a state of being attached to the top side portion 713 of the rotating frame body 710 via the bearing 717. The shaft body 77 is fixed to the support section 72 by the fixing member 751 of the support member 75 of the support section 72. The shaft body 78 is a member that allows the rotating frame body 710 to be rotated by the rotary shaft 800 in a state of being attached to the bottom side portion 714 of the rotating frame body 710 via the bearing 718. The shaft body 78 is fixed to the support member 76 by the fixing member 761 of the support member 76 of the support section 72. In the shaft body 78, a hollow portion 802 that allows the pipe to be disposed, and inlet/outlet ports 821 and 822 for the pipe are formed. The pipe 300 disposed in the hollow portion 802 is disposed to be led to an outside of the intermediate mold 70 via the inlet/outlet port 822 formed at a bottom side end portion of the shaft body 78 and via the through-hole 762 of the support member 76. The pipe 300 that is led to the outside of the intermediate mold 70 is connected to various devices (for example, a device that controls circulation of a refrigerant) included in the injection molding machine 100.

The rotation drive section 79 includes a rotational force generating portion 791 that generates a rotational force and a rotational force transmitting portion 792 that transmits the rotational force generated by the rotational force generating portion 791 to the rotating frame body 710, and rotates the rotating frame body 710. The rotational force generating portion 791 is configured to include a motor or the like. The rotational force transmitting portion 792 is configured to include a gearbox or the like.

In the rotation drive section 79, the rotational force of the rotational force generating portion 791 is transmitted to the rotating frame body 710 via the rotational force transmitting portion 792 serving as a rotational force transmitting mechanism to rotate the rotating frame body 710. The rotational force generating portion 791 is configured to include a motor or the like. The rotational force transmitting portion 792 is configured to include a gearbox or the like. In the rotation drive section 79, the rotational force of the rotational force generating portion 791 is transmitted to the rotating frame body 710 by the rotational force transmitting portion 792 serving as a rotational force transmitting mechanism to rotate the rotating frame body 710. That is, the rotational force transmitting portion 792 rotates the rotating frame body 710 by converting a rotation direction of a rotary shaft 900 of the rotational force generating portion 791 into a rotation direction of the rotary shaft 800.

In the rotation drive section 79 according to still another embodiment, the rotational force generating portion 791 is disposed at a position deviated from the rotary shaft 800 on the top side surface 752 of the support member 75 toward the first side, and the rotational force transmitting portion 792 is disposed on an extension line of the rotary shaft 800. Specifically, the rotational force generating portion 791 is disposed in a state where a part thereof is accommodated in the recessed portion 753 formed on the top side surface 752 of the support member 75.

Figure 9:
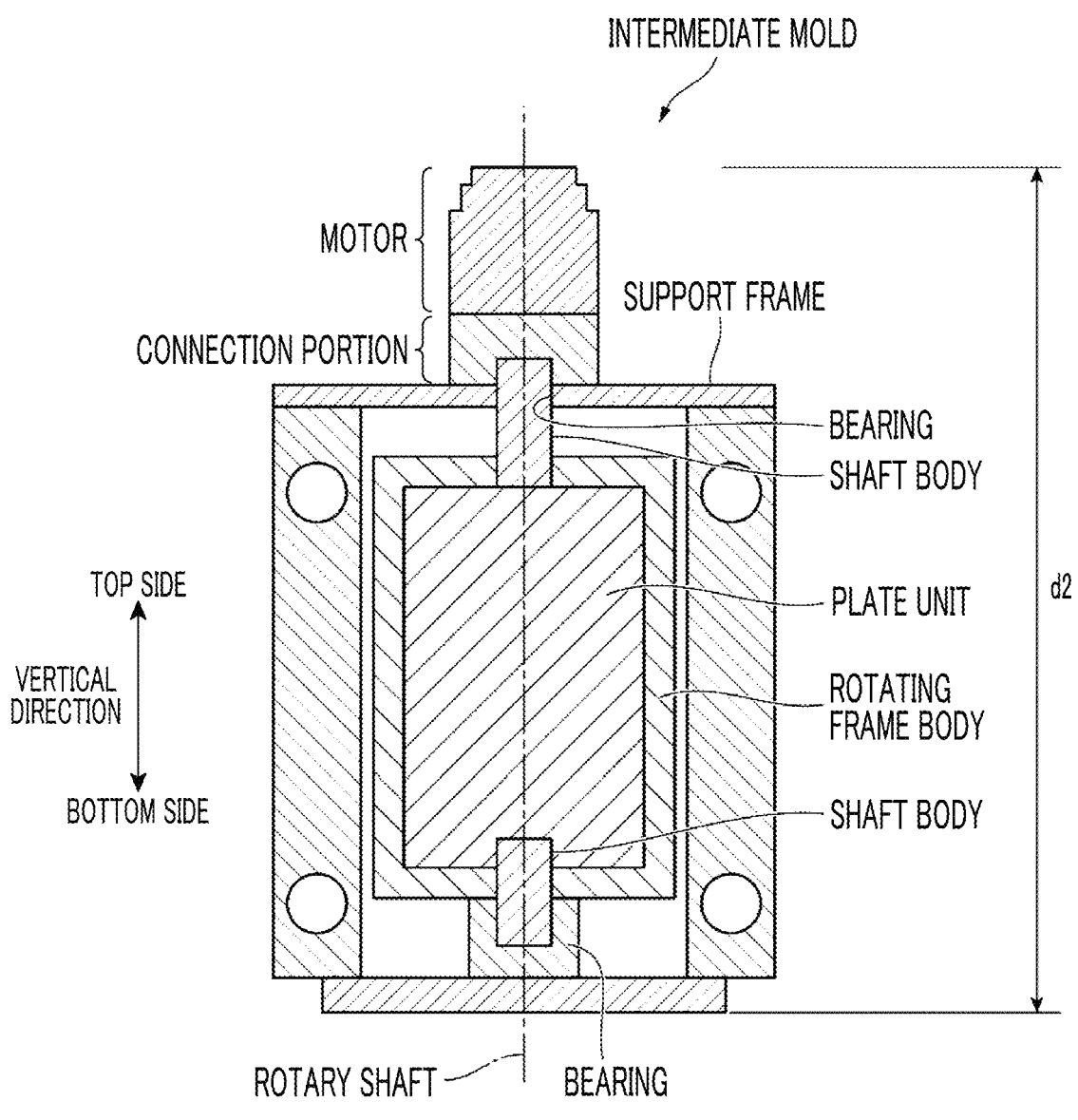
FIG. 9 is a cross-sectional view showing an example of a configuration of an intermediate mold of a mold unit mounted in an injection molding machine of the related art.

FIG. 9 is a cross-sectional view showing an example of a configuration of an intermediate mold of a mold unit mounted in an injection molding machine of the related art.

The intermediate mold of the related art shown in FIG. 9 includes a rotating frame body to which a plate unit of a mold are attached, shaft bodies respectively attached to a top side and a bottom side of the rotating frame body via bearings (not shown), a support frame that fixes the shaft bodies, and a motor that applies a rotational force to the rotating frame body via a connection portion. The rotating frame body is rotated together with a plate unit (not shown) by a rotary shaft shown in FIG. 9. The rotary shaft shown in FIG. 9 is in the same direction as the rotary shaft 800 shown in FIG. 8 described above.

When the length d4 of the intermediate mold 70 according to still another embodiment in the vertical direction shown in FIG. 8 is compared with a length d5 of the intermediate mold of the related art in the rotation axis direction shown in FIG. 9, d4<d5 is satisfied. As shown in FIG. 8, in the rotation drive section 79 according to still another embodiment, the rotational force generating portion 791 is disposed at a position deviated from the extension line of the rotary shaft 800 in a radial direction of the rotary shaft 800, and a part of the rotational force generating portion 791 is accommodated in the recessed portion 753 of the support member 75. Accordingly, the length d4 of the intermediate mold 70 in the vertical direction is shorter than the length d5 of the intermediate mold of the related art in the rotation axis direction.

In summary, the intermediate mold, the mold unit, and the injection molding machine to which still another embodiment of the present invention is applied can take various embodiments with the following configuration.

That is, the intermediate mold 70 according to still another embodiment is an intermediate mold disposed between the stationary side mold 30 and the movable side mold 20 in the mold unit 1 of the injection molding machine 100, and includes: the mold section 71 that performs the mold opening and closing operations with a facing mold of the stationary side mold 30 and the movable side mold 20; the rotating frame body 710 that is rotated together with the mold section 71 by the rotary shaft 800; the support section 72 that supports both sides of the rotating frame body 710 via the shaft bodies 77 and 78; and the rotation drive section 79 that transmits a rotational force to the rotating frame body 710, in which the support section 72 accommodates at least a part of the rotation drive section 79.

Here, the shaft bodies 77 and 78 may be respectively attached to both sides of the rotating frame body 710 in the vertical direction, and the support section 72 may support a top side and a bottom side of the rotating frame body 710 via the shaft bodies 77 and 78.

Accordingly, a compact size of the intermediate mold 70 in a form in which the rotating frame body 710 is rotated by the rotary shaft 800 extending in the vertical direction can be achieved.

In addition, the rotation drive section 79 may be connected to the top side of the rotating frame body 710, and the pipe 300 may be disposed in the shaft body 78 attached to the bottom side of the rotating frame body 710.

Accordingly, the pipe can be extended to the bottom side where the rotation drive section 79 is not disposed. As a result, when the fluid leaks from the pipe, a probability of the fluid leaking toward the top side due to a relationship with a path and sagging of the pipe can be reduced.

Modification Example

The above-described embodiments may be modified as follows, or may not be modified.

For example, in one and another embodiments described above, a configuration is adopted in which a part of the rotational force transmitting portion of the rotation drive section is accommodated in the recessed portion of the support member. However, the present invention is not limited thereto. An entirety of the rotational force transmitting portion may be accommodated in the recessed portion of the support member. In addition, a part or an entirety of the rotational force generating portion may be accommodated in the recessed portion of the support member. Here, the recessed portion 753 formed in the support section 72 according to still another embodiment shown in FIG. 8 described above is not deep enough to accommodate an entirety of the rotational force generating portion 791. However, in a case where a length of the support section 72 in the vertical direction is longer than a length of the rotational force generating portion 791 in the vertical direction, a part or the entirety of the rotational force generating portion 791 can be accommodated in the recessed portion.

In addition, in the embodiments described above, a gear mechanism including a gear box consisting of a plurality of gears is adopted as the rotational force transmitting mechanism that transmits the rotational force of the rotational force generating portion to the shaft body. However, the present invention is not limited thereto. For example, a mechanism (hereinafter, referred to as a "belt mechanism") that is configured to include one or more belts and one or more pulleys that are disk-shaped members for transmitting a rotational force from the belt to a rotary shaft may be adopted as the rotational force transmitting mechanism.

Here, comparing the gear mechanism and the belt mechanism, the gear mechanism transmits a rotational force by mechanically meshing gears or the like, whereas the belt mechanism transmits a rotational force by using a frictional force between the belt and the pulley. Therefore, the belt mechanism may cause slippage between the belt and the pulley, resulting in a transmission loss of the rotational force. However, even when a trouble occurs in a power transmission process, the belt mechanism can smoothly absorb an influence of the trouble to some extent, and thus can be said to be excellent in terms of drive stability. In addition, in terms of strength, the gear mechanism is superior to the belt mechanism. Although there is a type of belt mechanism in which teeth formed on a belt side and teeth formed on a pulley side mesh with each other, this type of belt mechanism does not have the same degree of strength as gears in a gear mechanism.

In addition, a gear mechanism and a belt mechanism may be used in combination as the rotational force transmitting mechanism. For example, in a case where the belt mechanism is accommodated in the recessed portion of the support member, it is necessary to wind a belt around both a transmission side and a reception side of the rotational force. Therefore, a size of the recessed portion needs to be larger than in a case where the gear mechanism is accommodated in the recessed portion. Therefore, it is preferable that the gear mechanism is set as a portion accommodated in the recessed portion and the belt mechanism is set as a portion not accommodated in the recessed portion. The gear mechanism and the belt mechanism may be accommodated in one box to integrate the rotational force transmitting mechanism, or may not be accommodated in one box.

Specifically, for example, in another embodiment shown in FIG. 7 described above, since an axis of the rotational force generating portion 591 and an axis of the rotational force transmitting portion 592 are deviated from each other, it is preferable to use a combination of a gear mechanism and a belt mechanism as the rotational force transmitting portion 592. In this case, the gear mechanism is disposed in the recessed portion 543 to achieve compactness of the intermediate mold 50, and the belt mechanism is disposed outside the recessed portion 543 to smoothly absorb an influence of a trouble that may occur in a power transmission process.

In addition, in one and another embodiments described above, the manifold 184 is included as a component of the second shaft section 18. However, the present invention is not limited thereto, and the manifold may be included as a component of the first shaft section 17.

In addition, in one and another embodiments described above, the rotation drive section is disposed on the second side in the rotation axis direction, but the present invention is not limited thereto. The rotation drive section may be disposed on the first side in the rotation axis direction. That is, the side on which the rotation drive section is disposed may be determined according to a position where an operation panel (not shown) of the injection molding machine 100 of FIGS. 1A and 1B is disposed or an ease of work for a worker.

It should be understood that the invention is not limited to the above-described embodiment, but may be modified into various forms on the basis of the spirit of the invention. Additionally, the modifications are included in the scope of the invention.

What is claimed is:

1. An intermediate mold that is disposed between a stationary side mold and a movable side mold in a mold unit of an injection molding machine, the intermediate mold comprising:

a mold section that performs mold opening and closing operations with a facing mold of the stationary side mold and the movable side mold;

a rotating frame body that is rotated together with the mold section by a rotary shaft;

a support section that supports both sides of the rotating frame body via shaft bodies; and a rotation drive section that includes a rotational force transmitting portion and transmits a rotational force to the rotating frame body via the rotational force transmitting portion, wherein the support section accommodates the rotational force transmitting portion at a position deviated from an extension line of the rotary shaft in a radial direction, and a rotational axis of the rotation drive section is parallel to the rotary shaft.

2. The intermediate mold according to claim 1, wherein a recessed portion that accommodates at least a part of the rotation drive section is formed in the support section.

3. The intermediate mold according to claim 2, wherein the recessed portion is formed at a position deviated from the extension line of the rotary shaft in the radial direction of the rotary shaft.

4. The intermediate mold according to claim 3, wherein the recessed portion is formed at a position deviated from the extension line of the rotary shaft toward a top side in a vertical direction.

5. The intermediate mold according to claim 4, wherein at least a part of a rotational force transmitting mechanism that transmits the rotational force to the rotating frame body in the rotation drive section is accommodated in the recessed portion.

6. The intermediate mold according to claim 5, wherein the rotational force transmitting mechanism is a gear mechanism that interlocks a plurality of gears.

7. The intermediate mold according to claim 1, wherein a part of the rotation drive section is disposed on the extension line of the rotary shaft.

8. The intermediate mold according to claim 1, wherein the rotation drive section includes a rotational force generating portion that generates the rotational force.

9. The intermediate mold according to claim 8, wherein the rotational force generating portion includes a motor.

10. The intermediate mold according to claim 1, wherein the shaft bodies include a hollow portion that allows a pipe through which a fluid passes to be disposed.

11. The intermediate mold according to claim 10, wherein both end portions of the hollow portion form inlet/outlet ports through which the pipe can enter and exit in a rotation axis direction of the shaft bodies.

12. The intermediate mold according to claim 11, wherein the shaft bodies are respectively attached to both sides of the rotating frame body in the rotation axis direction via bearings, and the rotation drive section and the pipe are disposed on a side of one of the shaft bodies.

13. The intermediate mold according to claim 1, wherein the shaft bodies are respectively attached to both sides of the rotating frame body in a vertical direction via bearings, and the support section supports a top side and a bottom side of the rotating frame body via the shaft bodies.

14. The intermediate mold according to claim 13, wherein the rotation drive section is connected to the top side of the rotating frame body, and a pipe through which a fluid passes is disposed in the shaft body attached to the bottom side of the rotating frame body.

15. The intermediate mold according to claim 1, wherein the shaft body is fixed to a second fixing member via a first fixing member, the second fixing member is fixed to a first side surface of the support section in a rotation axis direction, and the first fixing member fixes the shaft body in a state of penetrating the second fixing member.

16. The intermediate mold according to claim 15, wherein the first fixing member is joined to the shaft body and the second fixing member by welding, and the second fixing member is fixed to the first side surface of the support section by a bolt.

17. A mold unit of an injection molding machine, the mold unit comprising:

an intermediate mold disposed between a stationary side mold and a movable side mold, wherein the intermediate mold includes a mold section that performs mold opening and closing operations with a facing mold of the stationary side mold and the movable side mold, a rotating frame body that is rotated together with the mold section by a rotary shaft, a support section that supports both sides of the rotating frame body via shaft bodies, and a rotation drive section that includes a rotational force transmitting portion and transmits a rotational force to the rotating frame body via the rotational force transmitting portion, the support section accommodates the rotational force transmitting portion at a position deviated from an extension line of the rotary shaft in a radial direction, and a rotational axis of the rotation drive section is parallel to the rotary shaft.

18. An injection molding machine comprising:

a mold unit that includes a stationary side mold, a movable side mold, and an intermediate mold disposed between the stationary side mold and the movable side mold, the mold unit being mounted in the injection molding machine, wherein the intermediate mold includes a mold section that performs mold opening and closing operations with a facing mold of the stationary side mold and the movable side mold, a rotating frame body that is rotated together with the mold section by a rotary shaft, a support section that supports both sides of the rotating frame body via shaft bodies, and a rotation drive section that includes a rotational force transmitting portion and transmits a rotational force to the rotating frame body via the rotational force transmitting portion, the support section accommodates the rotational force transmitting portion at a position deviated from an extension line of the rotary shaft in a radial direction, and a rotational axis of the rotation drive section is parallel to the rotary shaft.

* * * * *